(12) United States Patent
Manwell et al.

(10) Patent No.: US 12,710,090 B2
(45) Date of Patent: Aug. 18, 2026

(54) MULTI-CHAMBER INTERNALLY DAMPED TUNED VIBRATION ABSORBER

(71) Applicant: Textron Aviation Inc., Wichita, KS (US)

(72) Inventors: Richard Alan Manwell, Wichita, KS (US); Lloyd Maurice Kronk, Wichita, KS (US); Anindya Ghosh, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 1025 days.

(21) Appl. No.: 17/822,828

(22) Filed: Aug. 29, 2022

(65) Prior Publication Data

US 2023/0061308 A1 Mar. 2, 2023

Related U.S. Application Data

(60) Provisional application No. 63/239,120, filed on Aug. 31, 2021.

(51) Int. Cl.

| | |
|---|---|
| ***F16F 15/08*** | (2006.01) |
| ***B64C 1/26*** | (2006.01) |
| ***F16F 15/22*** | (2006.01) |

(52) U.S. Cl.

CPC .............. *F16F 15/08* (2013.01); *F16F 15/22* (2013.01); *B64C 1/26* (2013.01); *F16F 2224/025* (2013.01); *F16F 2230/0052* (2013.01); *F16F 2232/08* (2013.01)

(58) Field of Classification Search

CPC ...... F16F 15/08; F16F 15/22; F16F 2224/025; F16F 2230/0052; F16F 2232/08; F16F 1/3732; F16F 1/3737; F16F 2238/026; F16F 7/116; B64C 1/26

See application file for complete search history.

(56) References Cited

U.S. PATENT DOCUMENTS

| | | | | | |
|---|---|---|---|---|---|
| 2,442,754 | A * | 6/1948 | Beam | F16F 1/373 | 24/581.1 |
| 2,951,674 | A * | 9/1960 | Rice | F16F 1/3732 | 411/510 |
| 3,145,012 | A * | 8/1964 | Kfoury | F16F 7/08 | 188/380 |
| 3,319,918 | A * | 5/1967 | Rapata | F16B 37/043 | 267/141 |
| 3,756,551 | A * | 9/1973 | Bishop | B60G 11/22 | 267/141.1 |
| 5,016,409 | A * | 5/1991 | Sato | E01D 19/00 | 52/167.2 |
| 5,650,600 | A * | 7/1997 | Walters | B60Q 5/003 | 200/61.54 |
| 5,687,948 | A * | 11/1997 | Whiteford | B64D 27/402 | 267/140.13 |

(Continued)

*Primary Examiner* — Robert A. Siconolfi
*Assistant Examiner* — James K Hsiao
(74) *Attorney, Agent, or Firm* — Avek IP, LLC

(57) ABSTRACT

A multi-chamber internally damped tuned vibration absorber includes a mass having internal chambers that house damping members for dissipating vibrational motion of the mass. Guide members pass through the internal chambers and guide movement of the mass. An attachment member attaches the guide members to a structure to attenuate vibrations of the structure.

16 Claims, 7 Drawing Sheets

(56) References Cited

U.S. PATENT DOCUMENTS 5,699,865 A * 12/1997 Forderer ............ B27B 17/0033 267/269
6,592,141 B1 * 7/2003 Dancasius .......... B60R 21/2037 280/728.1
6,681,908 B2 * 1/2004 Davis ..................... F16F 7/116 188/380
6,719,503 B1 * 4/2004 McCalmont ....... B23Q 17/0976 188/380
7,246,797 B2 * 7/2007 Gustavsson ............ F16F 7/108 267/269
7,322,602 B2 * 1/2008 Tsujimoto .......... B60R 21/2037 200/61.54
7,389,977 B1 * 6/2008 Fernandez ............. F16F 3/087 267/293
7,735,812 B2 * 6/2010 Fitzgerald ............ F16F 1/3732 267/293
8,602,451 B2 * 12/2013 James ................ B60R 21/2037 200/61.54
8,939,466 B2 * 1/2015 James ................ B60R 21/2037 280/731
9,360,271 B1 * 6/2016 McPherson ............ F16F 7/108
9,366,311 B2 * 6/2016 Gustavsson ............ F16F 15/08
9,937,628 B2 * 4/2018 Werner ................. B25J 13/086
10,414,234 B2 9/2019 McGuire et al.
10,644,579 B2 5/2020 Nerubenko et al.
10,820,951 B2 11/2020 Soundararajan et al.
11,215,255 B2 1/2022 Mendoza
11,333,215 B2 5/2022 Lammi
11,685,435 B2 * 6/2023 Myklebust ........... F16F 1/3842 280/731
2002/0125698 A1 * 9/2002 Schutz .................... B62D 1/04 280/731
2004/0040809 A1 * 3/2004 Gustavsson ........... F16F 1/3713 267/136
2004/0200682 A1 * 10/2004 Herrera .................. F16F 7/104 188/380
2007/0131504 A1 * 6/2007 Bronowicki .......... F16F 15/035 188/379
2012/0306119 A1 * 12/2012 Boes .................... F16F 1/3842 188/380
2014/0131982 A1 * 5/2014 Ishii ................... B60R 21/2037 280/728.2
2015/0097076 A1 * 4/2015 Lakic ....................... B64C 3/38 244/46
2016/0281813 A1 * 9/2016 Gustavsson ........... F16F 15/022
2017/0009836 A1 * 1/2017 Gustavsson ............ F16F 1/373
2017/0144594 A1 * 5/2017 Obayashi ................ B62D 1/04
2017/0219039 A1 * 8/2017 Inoue ................... F16F 15/002
2017/0268591 A1 * 9/2017 Harne ..................... F16F 7/108
2018/0306241 A1 * 10/2018 Ciciriello ............... F16C 27/04
2019/0175365 A1 * 6/2019 Herr ......................... A61F 2/68
2020/0309226 A1 * 10/2020 Dürre ...................... F16F 7/108
2020/0339192 A1 * 10/2020 Myklebust ............. F16F 1/376

* cited by examiner

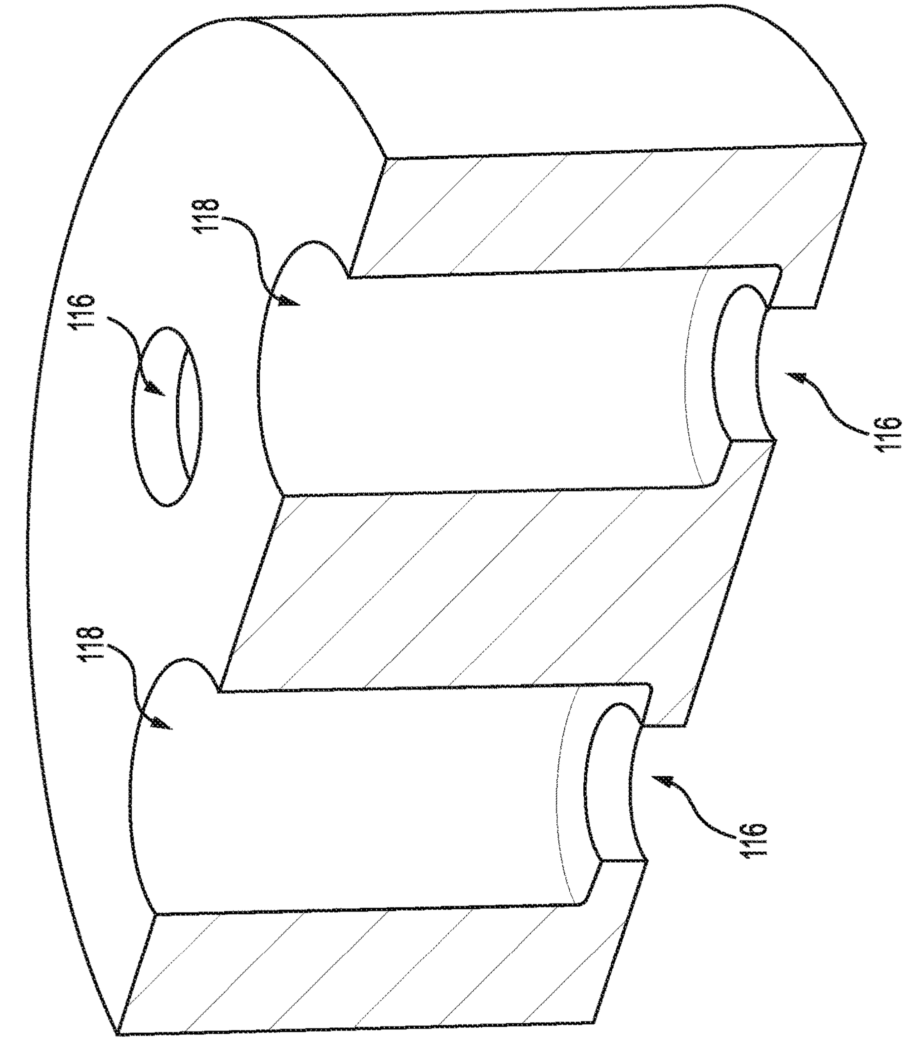
118
116
116
118
116
FIG. 4
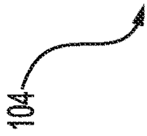
104

104
140
122
120
138
120
122
130
100
120
122
130

MULTI-CHAMBER INTERNALLY DAMPED TUNED VIBRATION ABSORBER

CROSS-REFERENCE TO RELATED APPLICATIONS

This application claims the benefit of U.S. Provisional Application No. 63/239,120 entitled "Multi-Chamber Internally Damped Tuned Vibration Absorber" and filed on Aug. 31, 2021, which is herein incorporated by reference in its entirety.

BACKGROUND

1. Field of the Disclosure

Embodiments of this disclosure relate generally to structural vibration mitigation, and more specifically, to a tuned vibration absorber (TVA) for fixed-wing aircraft.

2. Description of the Related Art

Many tuned vibration absorbers (TVAs) have been described in the prior art. For example, U.S. Pat. No. 10,414,234 to McGuire et al. discloses a damper with a tuned vibration absorber included in a shock absorber. U.S. Pat. No. 10,820,951 to Soundararajan et al. discloses an apparatus to damp vibration in a robotic arm in a surgical system. U.S. Pat. No. 10,644,579 to Nerubenko et al. discloses a vibration energy harvesting damper.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to a vibration-reduction apparatus, including: a mass having a plurality of openings extending through the mass in a first direction; a plurality of guide members each disposed within a respective one of the openings, wherein the guide members are configured to guide movement of the mass back and forth along the first direction; a plurality of internal chambers each formed around a portion of a respective one of the guide members within a respective one of the openings; a plurality of damping members each disposed in a respective one of the internal chambers, wherein the damping members are configured to dampen movement of the mass along the first direction; and an attachment member configured to mechanically couple the guide members to a structure for reducing a vibrational motion of the structure.

In some aspects, the techniques described herein relate to a multi-chamber internally damped tuned vibration absorber, including: a mass having a first bore extending through the mass in a longitudinal direction, and a second bore extending through the mass in the longitudinal direction, the second bore being parallel with the first bore; the first bore having a first opening and a second opening opposite the first opening, the first opening being narrower than the second opening; the second bore having a third opening and a fourth opening opposite the third opening, the fourth opening being narrower than the third opening; wherein the first opening and the third opening are on a first side of the mass, and the second opening and the fourth opening are on a second side of the mass, opposite the first side; a first guide member extending through the first bore in the longitudinal direction, the first guide member having a narrow portion that protrudes through the first opening and a wide portion that protrudes through the second opening; a second guide member extending through the second bore in the longitudinal direction, the second guide member having a narrow portion that protrudes through the fourth opening and a wide portion that protrudes through the third opening; a first internal chamber formed in the first bore of the mass between the first opening and the wide portion of the first guide member; a first damping member housed within the first internal chamber; a second internal chamber formed in the second bore of the mass between the fourth opening and the wide portion of the second guide member; a second damping member housed within the second internal chamber; wherein the first damping member and the second damping member are configured to damp vibrational motion of the mass in the longitudinal direction; and an attachment member configured for mechanically coupling the first guide member and the second guide member to a structure for reducing a vibrational motion of the structure.

BRIEF DESCRIPTION OF THE DRAWINGS

Illustrative embodiments of the present disclosure are described in detail below with reference to the attached drawing figures, which are incorporated by reference herein and wherein:

FIG. 4 is a cross-sectional view of a mass used with the multi-chamber internally damped TVA of FIG. 1, in an embodiment;

DETAILED DESCRIPTION

Wing struts on aircraft may vibrate substantially during certain high-powered ground operations and due to certain flight conditions (e.g., following formation of ice on aircraft wing struts). The vibration is a source of repeated loading on aircraft structures and a source of passenger and crew discomfort. Repeated loading causes fatigue in the aircraft wing struts, which reduces their operational lifetime and increases the operational burden on the aircraft due to frequent recurring maintenance inspections on the struts.

Generally, vibration absorbers include an inertia element (i.e., mass) and an energy-dissipating element (i.e., damper), in which the mass moves in response to a vibrational loading. The vibration absorber is then tuned to match a particular frequency. In practice, most tuned vibration absorber (TVAs) use an elastomeric component for energy dissipation.

Embodiments of the present disclosure provide a TVA with multiple internal damping members to decrease vibrations at a target frequency. The TVA is mounted to a structure to counteract vibrations of the structure (e.g., a wing strut). Specifically, the TVA is tuned to reduce a peak vibrational loading of the structure. The tuned mass and compression spring combination together determine the natural frequency that the TVA will attenuate. By incorporating multiple damping members in the TVA mass, the damping members' operating load remains low, which extends the operational lifetime of the damping members significantly.

In some embodiments, multiple TVAs may be tuned to different frequencies and used in combination for reducing vibrations at the different frequencies. Further, in other embodiments, the TVA may be adapted for vibration reduction during different phases of flight. For example, the TVA may be adapted to provide vibration reduction during climb, cruise, descent, or ground operations at any power level where vibrations arise.

Figure 1:
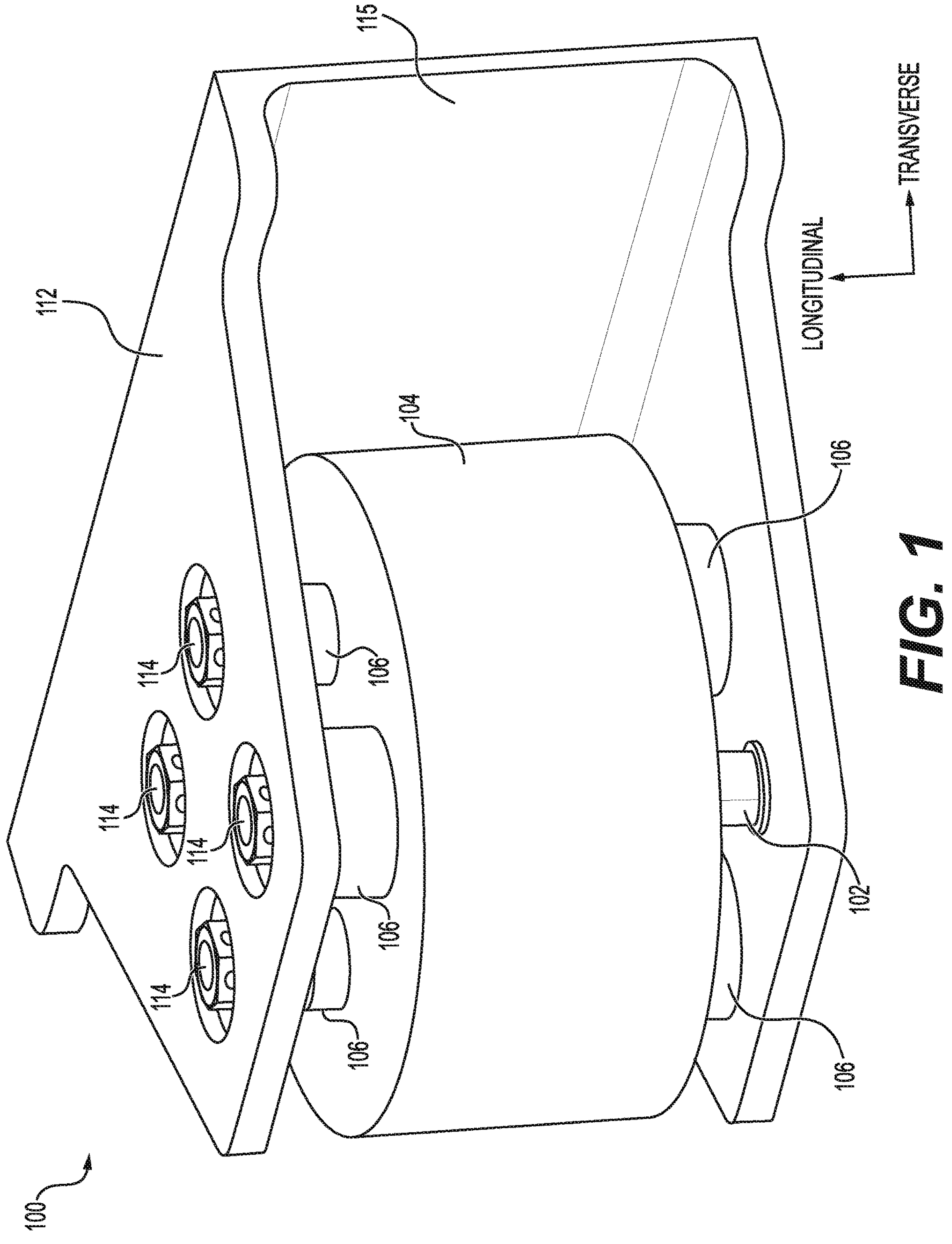
FIG. 1 is a perspective view of a multi-chamber internally damped tuned vibration absorber (TVA), in an embodiment.
Figure 2:
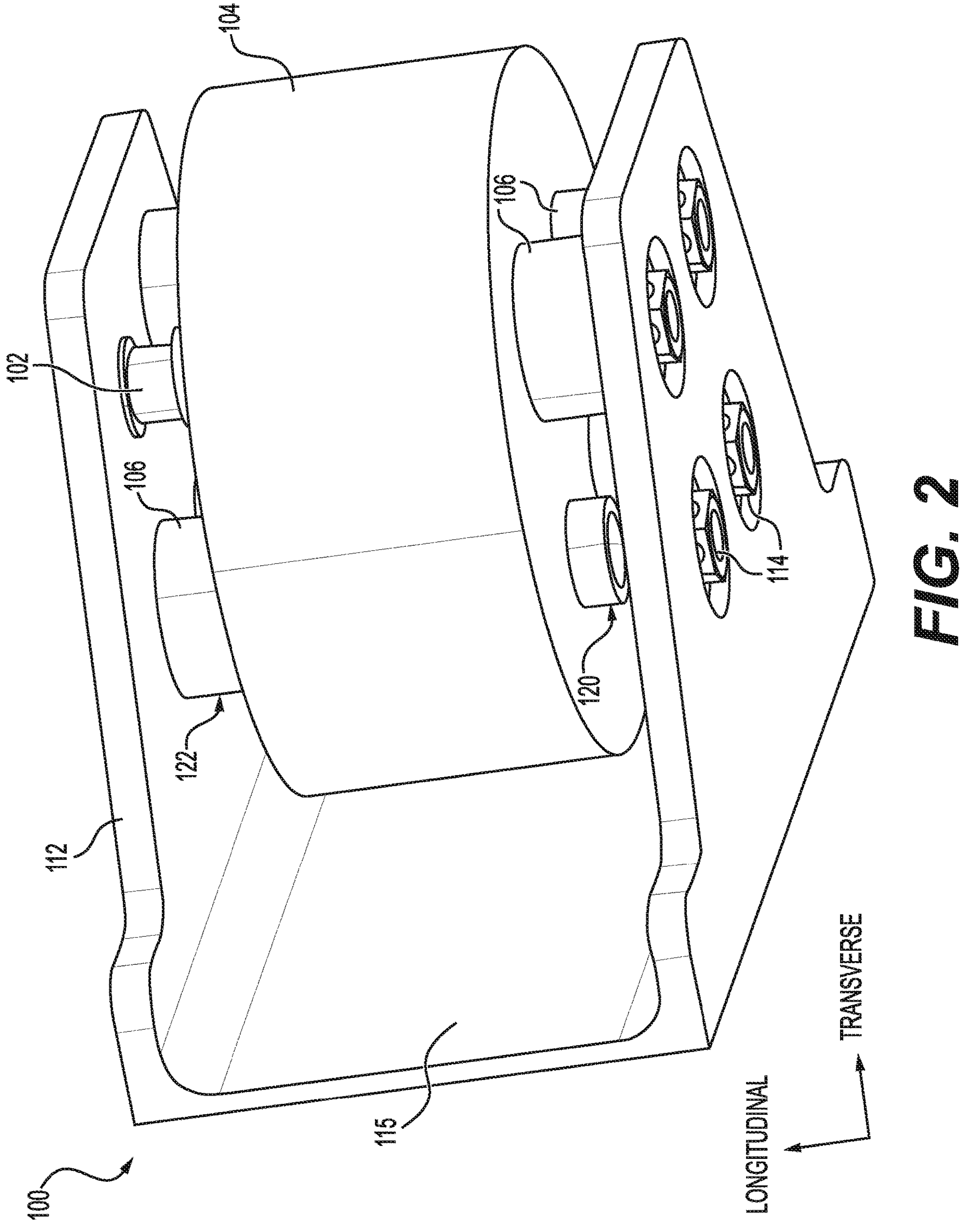
FIG. 2 is another perspective view of the multi-chamber internally damped TVA of FIG. 1.

FIGS. 1 and 2 are perspective views of an exemplary multi-chamber internally damped TVA 100. FIGS. 1 and 2 show multi-chamber internally damped TVA 100 from opposing sides/angles and are best viewed together with the following description. A mass 104 serves as the inertia element of TVA 100. Specifically, mass 104 is configured to oscillate back and forth about a plurality of guide members 106 along a longitudinal direction, as depicted in FIG. 1. In some embodiments, mass 104 is a solid material that may be made of a metal or metal alloy. As depicted in FIG. 1, mass 104 is a cylindrical shape; however, it is contemplated that the mass 104 may be another shape, such as a sphere, cube, or other polyhedral, without departing from the scope hereof.

An attachment member 112 is configured for attaching to a structure (not shown) to reduce vibration of the structure. For example, holes (not shown) may be drilled in a side wall 115 of attachment member 112 for aligning with matching holes in the structure, and fasteners may be placed through matched pairs of aligned holes for fastening the attachment member 112 to the structure. Alternatively, the side wall 115 may be bonded or welded to the structure. The attachment member 112 is for example a bracket or part configured for attaching TVA 100 to the structure. In embodiments, the structure is an aircraft wing strut. For example, attachment member 112 may be mounted to an aft-facing web of the wing strut. In other embodiments, the structure is a frame, a strut, a stringer, a skin portion, an engine beam mount, a rudder pedal, or a heads-up display assembly.

Each of the plurality of guide members 106 is mechanically coupled to attachment member 112. For example, each of the plurality of guide members 106 may include protrusions extending from each end that are mechanically coupled with attachment member 112. Alternatively, an insert 102, as best viewed in FIG. 3, may be used to mechanically couple each guide member 106 to attachment member 112. Each protrusion or insert may be mechanically coupled to attachment member 112 via a fastener 114. Fastener 114 is for example a bolt, and each end of the insert 102 or protrusion of guide member 106 is threaded. The bolt secures one end of the insert 102 or guide member 106 to attachment member 112 via a threaded coupling.

Figure 3:
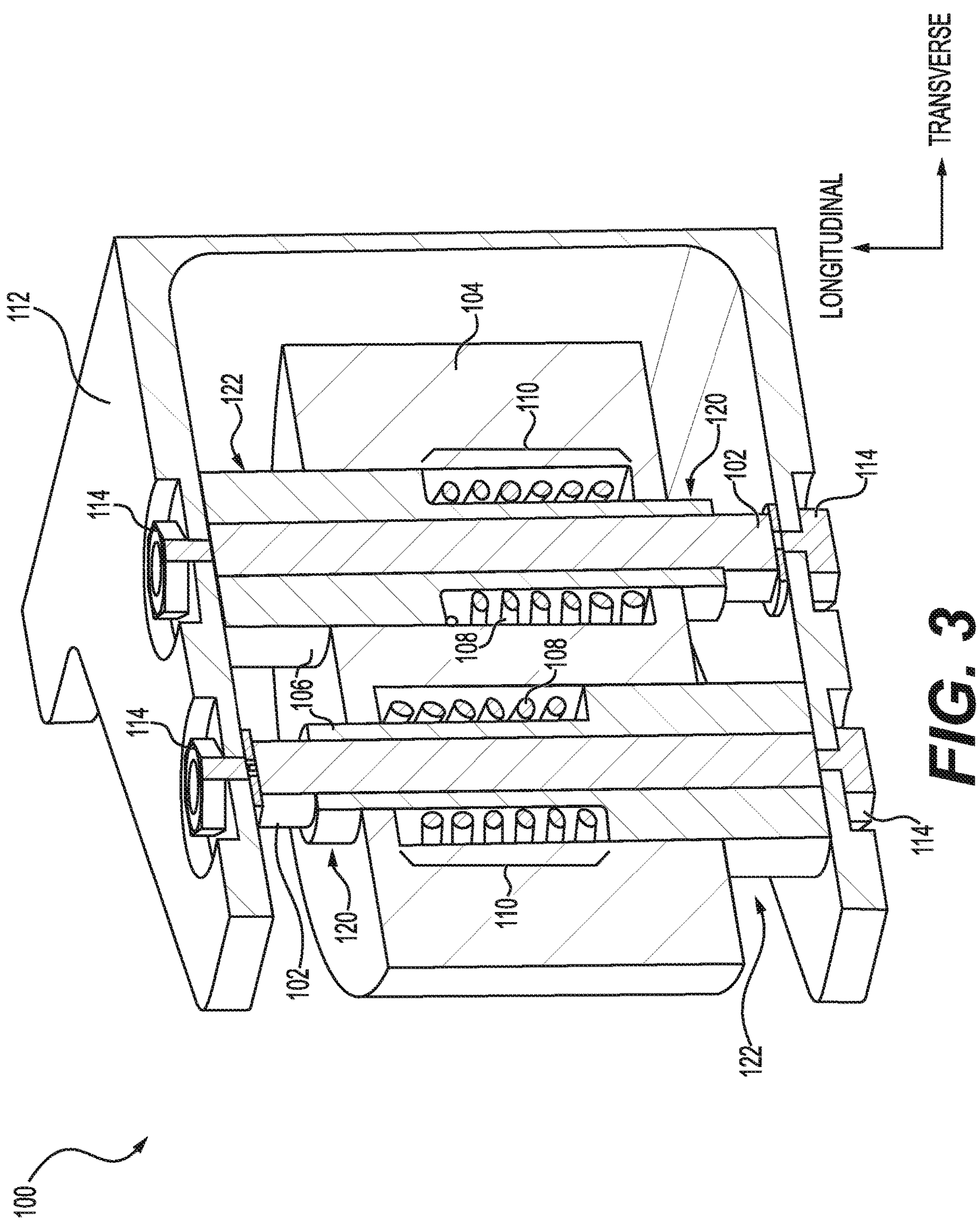
FIG. 3 is a cross-sectional view of the multi-chamber internally damped TVA of FIG. 1.

FIG. 3 is a cross-sectional side view of the multi-chamber internally damped TVA 100 of FIGS. 1 and 2. As shown in the cross-sectional view of FIG. 3, each of the guide members 106 are aligned in parallel in the longitudinal direction and pass through a respective bore within the mass 104. The bores are configured to guide and constrain movement of mass 104 along guide members 106. Specifically, guide members 106 guide movement of mass 104 in the longitudinal direction and prevent movement of mass 104 in the transverse direction. As depicted in FIGS. 1-3 and 5, the longitudinal and transverse directions are perpendicular to one another. Mass 104 includes at least two bores with a respective guide member 106 passing through each bore. In the embodiment depicted in FIGS. 1 and 2, mass 104 includes four bores each having a respective guide member 106. However, mass 104 may include greater or fewer than four bores and guide members 106 without departing from the scope hereof.

FIG. 4 is a cross-sectional view of mass 104. Each bore includes a first opening 116 and a second opening 118. The openings 116, 118 each provide an outlet of the bore for a guide member 106 to pass through. In embodiments, the first opening 116 has a narrower diameter compared with the second opening 118. Each bore has a narrow-diameter portion extending to first opening 116 and a wide-diameter portion extending to second opening 118, as depicted in FIG. 4. The wide-diameter portion comprises more than half of the depth of the bore, which is used to form an internal chamber 110, as depicted in FIG. 3. As depicted in FIG. 4, the bores may be identical in size and shape.

Referring again to FIG. 3, the guide members 106 pass through the bores and align the mass 104 between arms of attachment member 112. Each guide member 106 has a narrow portion 120 and a wide portion 122. The narrow portion 120 of the guide member 106 is sized to fit within the first opening 116 of mass 104, and the wide portion 122 is sized to fit within the second opening 118 of mass 104. The internal chamber 110 is formed around the narrow portion 120 of each guide member 106 within the wide-diameter portion of mass 104.

Each internal chamber 110 is configured to house a damping member 108. The damping members 108 are, for example, compression springs, as depicted in FIG. 3. However, other damping mechanisms may be substituted for compression springs, such as polyurethane rods, a hybrid polyurethane rod and spring combination, magnets, other damping materials, or some combination thereof. Damping members 108 support mass 104 about guide members 106 and are configured to absorb vibrational energy/motion of mass 104.

In embodiments, the narrow openings of the two bores are oppositely arranged. As depicted in FIG. 3, the left bore has the narrow opening (e.g., first opening 116, FIG. 4) at the top and the wide opening (e.g., second opening 118, FIG. 4) at the bottom. The right bore depicted in FIG. 3 is oppositely arranged with respect to the left bore. Accordingly, the guide members 106, being configured to pass through the bores and protrude outside of mass 104, are also arranged oppositely with one another. For example, as depicted in FIG. 3, the guide member 106 on the left has the narrow portion 120 above the wide portion 122, whereas the guide member 106 on the right has the wide portion 122 above the narrow portion 120. By oppositely arranging the narrow/wide openings (e.g., first and second openings 116/118) of the mass 104 and the corresponding narrow/wide portions 120/122 of the guide members 106, the internal chamber 110 is formed around each guide member 106 within the mass 104. The internal chambers 110 are oriented longitudinally around a part of the narrow portion 120 of each guide member 106.

In embodiments, the guide members 106 extend through the bores of the mass 104 for guiding movement of the mass 104 within the attachment member 112. Mass 104 is aligned by the guide members 106 and supported by damping members 108, which exert an opposing force that resists movement of the mass 104 during TVA 100 operation. The wide-diameter portion of the bore has a predetermined depth. Similarly, the narrow portion 120 of each guide member 106 has a predetermined length. Together, the depth of the wide-diameter portion of the bore and the length of the narrow portion 120 of each guide member 106 determines a length of internal chamber 110 for housing damping member 108.

Each damping member 108 may be arranged concentrically around the narrow portion 120 of the guide member 106 and housed inside the internal chamber 110. The length of each internal chamber 110 is configured to provide a preload on each respective damping member 108. In embodiments, a length of the internal chamber 110 may be adjusted by changing the length of the narrow portion 120 of the guide member 106 or the length of the wide-diameter portion of the bore in the mass 104, or both.

In embodiments, the damping members 108 are compression springs that are preloaded by being enclosed in the internal chamber 110, constrained on one end by the first opening 116 of the mass 104 and the other end by the wide portion of the guide member 106. In other words, a length of each internal chamber 110 is less than an uncompressed length of damping members 108. In an embodiment, the amount of preload (i.e., the preload value) of the damping members 108 is set by modifying the internal chamber 110 length. An increased internal chamber 110 length decreases the amount of compression force on the damping members 108. Conversely, a decreased internal chamber 110 length increases the amount of compression force on the damping members 108. The internal chamber 110 length and the properties of the damping member 108 (e.g., the spring rate of a compression spring) determine a travel distance of the mass 104. The travel distance of the mass 104 depends on a height of the fully compressed damping member 108 and a height of the preloaded spring. This assumes that the damping members 108 bottom out before the mass 104 hits the attachment member 112. For example, a damping member 108 with a fully compressed height of 0.65 inch that has a height at preload of 1.00 inch would provide a range of travel of 0.35 inch in one direction of motion from a neutral position, and a total range of motion in both directions of 0.70 inch (provided sufficient clearance exists between the mass 104 and the attachment member 112 at full compression of the damping members 108). In embodiments, an external secondary damping member is disposed between the mass and the attachment member, which may reduce the total range of motion of mass 104 (see e.g., FIGS. 6 and 7 and their description below).

In embodiments, the TVA 100 is attached to a structural member via attachment member 112. However, in other embodiments, it is contemplated that the TVA 100 is attached directly to a structural member, at least partially. For example, guide members 106 may be directly attached to a structural member at one end and attached to the structural member via a bracket at the opposite end. In embodiments in which the structural member is an I-beam (i.e., a beam having an "I" shaped cross-section), guide members 106 may be attached at each end to opposing flanges of the I-beam.

In some embodiments, the bores in mass 104 are sized to provide a predetermined amount of mass 104 for tuning the vibration-reduction apparatus to attenuate vibrational motion at a desired frequency. Additionally, in embodiments, the bores in mass 104 may be sized or located within mass 104 to provide a predetermined material distribution within mass 104.

Figure 5:
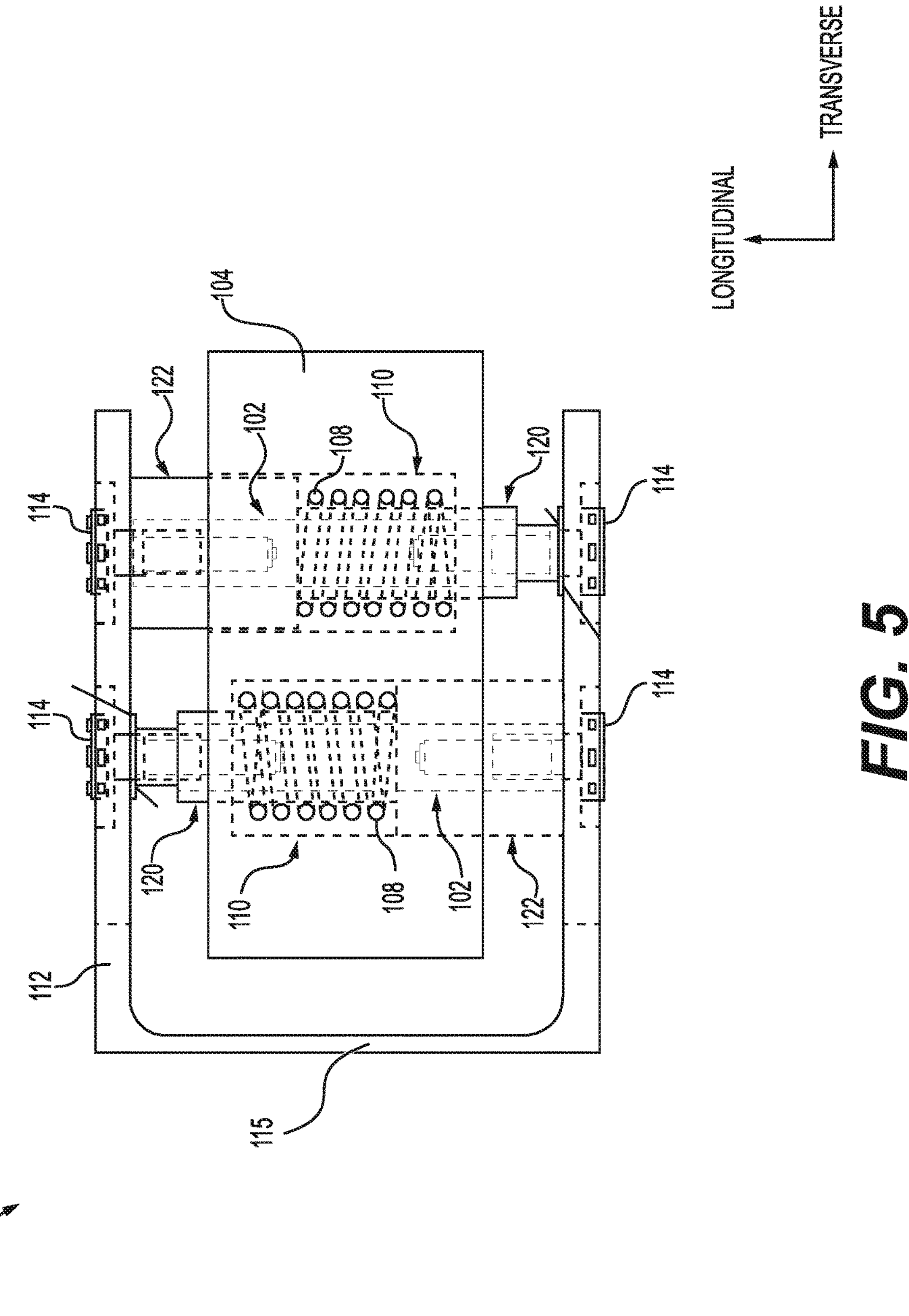
FIG. 5 is a side view of the multi-chamber internally damped TVA of FIG. 1.

FIG. 5 is a side view of multi-chamber internally damped TVA 100. Dashed lines in FIG. 5 indicate internal components of TVA 100 that would otherwise not be visible to an ordinary observer via a side view. Fasteners 114 are used to fasten inserts 102 to attachment member 112. Inserts 102 pass longitudinally through guide members 106 and are configured to secure guide members 106 in the longitudinal direction between arms of attachment member 112. In other embodiments, it is contemplated that the inserts 102 may be adhered to the attachment member 112 using a nut plate, spring pin, hairpin cotter pin, split pin, linchpin, adhesive, or other fastener, or some combination thereof. In embodiments, inserts 102 are made of a strong durable material such as a metal or metal alloy. In some embodiments, inserts 102 are made of steel.

Figure 6:
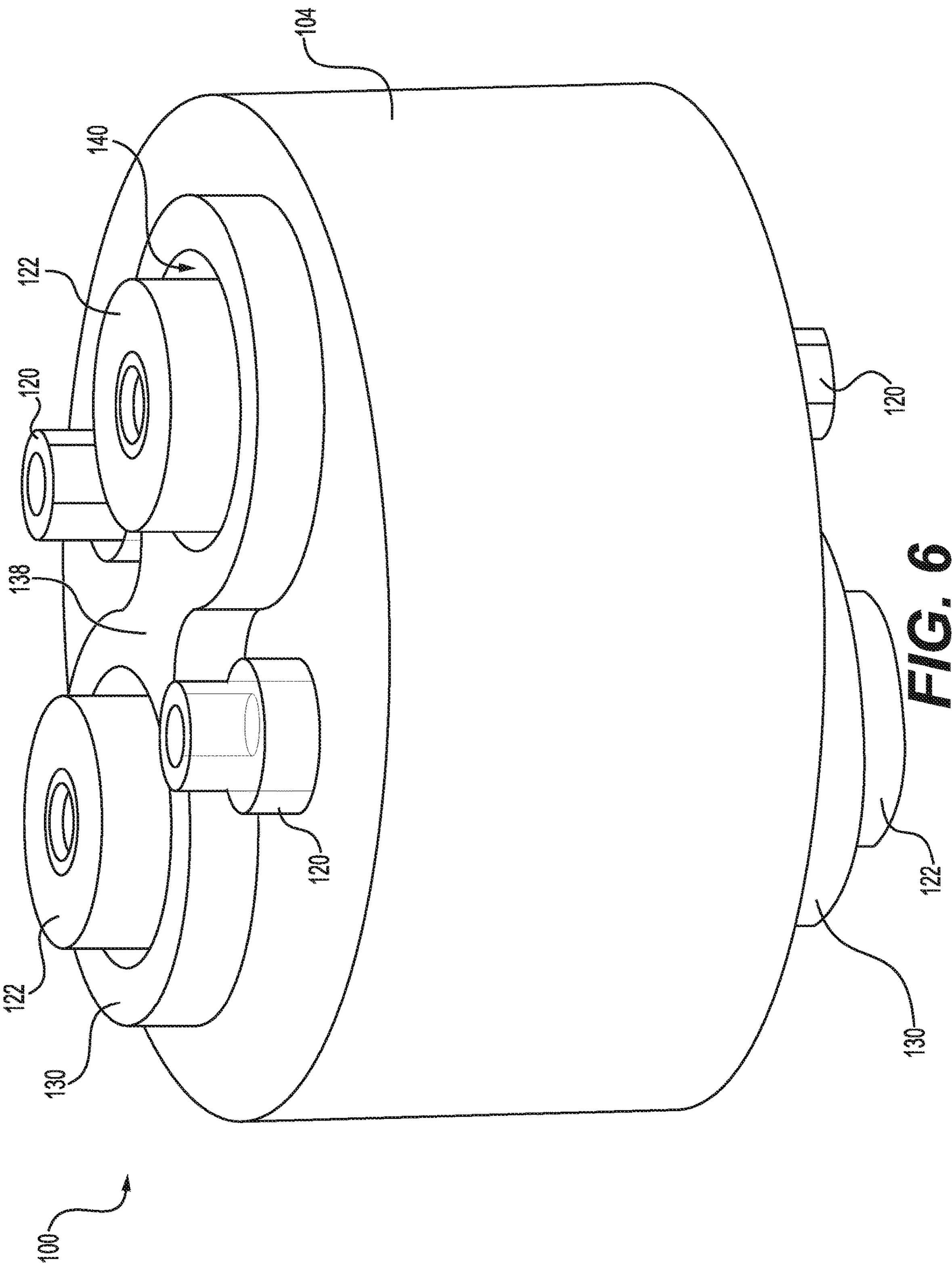
FIG. 6 is a perspective view of another embodiment of a multi-chamber internally damped TVA.

FIG. 6 is a perspective view of multi-chamber internally damped TVA 100 having an exemplary elastomeric bumper 130. In embodiments, TVA 100 may include an elastomeric bumper 130 on both ends of mass 104. As depicted in the FIG. 6 embodiment, a first elastomeric bumper 130 is disposed around a pair of guide members 106 at a first end of mass 104 and a second elastomeric bumper 130 is disposed around a pair of guide members 106 at a second end of mass 104 opposite the first end. As depicted in FIG. 6, elastomeric bumper 130 is disposed around the wide portion 122 of each of the guide members 106; however, the elastomeric bumper may be configured to fit around the narrow portion 120 without departing from the scope hereof. Alternatively, elastomeric bumper 130 may be configured to fit around all four guide members 106 on each end of mass 104. Alternatively, individual rings of elastomeric material may be adhered around each of guide members 106; however, having a single piece of connected material facilitates installation. When installed with TVA 100, elastomeric bumper 130 is disposed between mass 104 and attachment member 112. As depicted in FIG. 6, elastomeric bumper 130 is adhered to mass 104. Alternatively, elastomeric bumper 130 could instead be adhered to attachment member 112 without departing from the scope hereof.

In operation, elastomeric bumper 130 provides a secondary energy absorber to TVA 100, with damping members 108 serving as the primary energy absorber. The elastomeric bumpers 130 are configured to dampen any potential impact between mass 104 and attachment member 112, which may happen during high loading situations. The elastomeric bumpers 130 prevent direct contact between mass 104 and attachment member 112.

Preferably, elastomeric bumper 130 comprises a single piece of material to be readily installable and to be securely fitted around guide members 106. For example, elastomeric bumper 130 may comprise a pair of rings with a bridge portion 138 connecting the pair of rings, as depicted in FIG. 6. Elastomeric bumper 130 is adhered to mass 104 such that elastomeric bumper 130 moves back and forth with mass 104. In certain embodiments, an adhesive is used to adhere elastomeric bumper 130 to mass 104.

Figure 7:
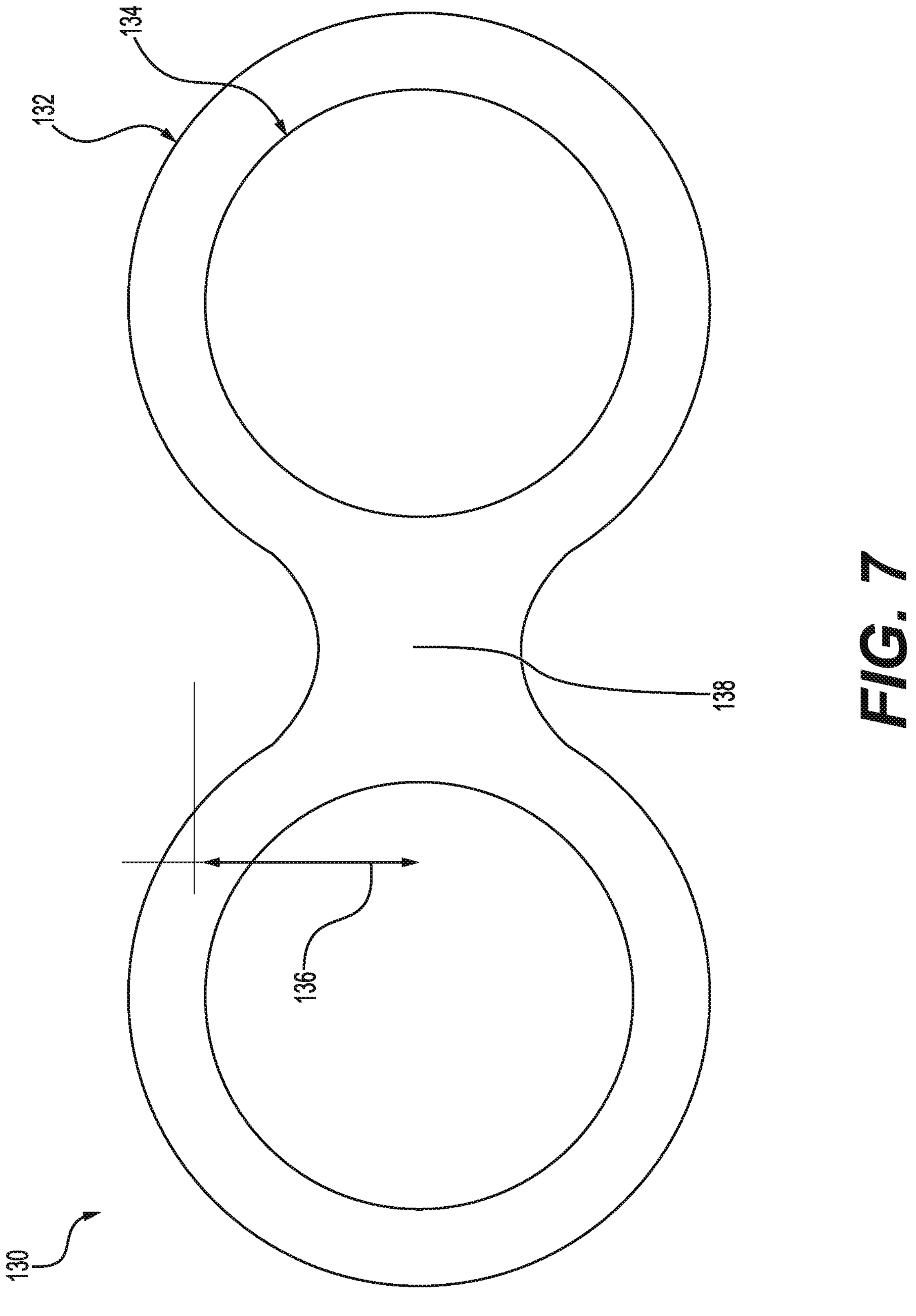
FIG. 7 shows an elastomeric bumper of the multi-chamber internally damped TVA of FIG. 6, in an embodiment.

FIG. 7 shows an exemplary elastomeric bumper 130 having a pair of internal holes within a pair of ringed portions, with the pair of ringed portions being connected by bridge portion 138. Each of the internal holes is substantially circular and includes an inner face 134. An outer face 132 of each of the pair of rings is also substantially circular in shape. An internal radius 136 of the inner holes is sized to fit loosely around an end of one guide member 106 such that elastomeric bumper 130 may move with mass 104 freely up and down with respect to the damping members 108. In embodiments, internal radius 136 is configured for fitting around wide portion 122 of one guide member 106. The bridge portion 138 may be narrower than the circular rings to accommodate neighboring guide members 106. For example, as depicted in FIG. 6, bridge portion 138 is configured to extend between the narrow portion 120 of two guide members 106. As can be seen in FIG. 7, bridge portion 138 is narrower than an internal diameter of the internal holes.

Many different arrangements of the various components depicted and components not shown are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims.

The invention claimed is:

1. A vibration-reduction apparatus, comprising:

a mass having a plurality of openings extending through the mass in a first direction, wherein each of the openings comprises a through hole that passes through the mass with a narrow outlet and a wide outlet opposite the narrow outlet, and the openings comprise a pair of oppositely arranged openings having the narrow outlet of a first opening of the pair on a first side of the mass and the wide outlet of a second opening of the pair also on the first side of the mass;

a plurality of guide members each disposed within a respective one of the openings, wherein the guide members are configured to guide movement of the mass back and forth along the first direction, and each of the guide members comprises a narrow portion that protrudes through the narrow outlet of the mass and a wide portion that protrudes through the wide outlet of the mass;

a plurality of internal chambers each formed around a portion of a respective one of the guide members within a respective one of the openings;

a plurality of damping members each disposed in a respective one of the internal chambers, wherein the damping members are configured to dampen movement of the mass along the first direction; and an attachment member configured to mechanically couple the guide members to a structure for reducing a vibrational motion of the structure.

2. The apparatus of claim 1, wherein the guide members comprise a pair of oppositely arranged guide members having the narrow portion of a first guide member of the pair disposed through the narrow outlet of the first opening on the first side of the mass and the wide portion of a second guide member of the pair disposed through the wide outlet of the second opening on the first side of the mass.

3. The apparatus of claim 1, wherein the damping members comprise compression springs.

4. The apparatus of claim 1, wherein the damping members comprise polyurethane rods.

5. The apparatus of claim 1, wherein the damping members each comprise a polyurethane rod and a spring.

6. The apparatus of claim 1, wherein the structure is one of a frame, a strut, a stringer, a skin portion, an engine beam mount, a rudder pedal, or a heads-up display assembly of an aircraft.

7. The apparatus of claim 1, wherein the structure is an aircraft wing strut and the attachment member is mechanically coupled to an aft-facing web of the aircraft wing strut.

8. The apparatus of claim 1, wherein the internal chambers comprise a length that is less than an uncompressed length of each of the damping members such that each of the damping members is preloaded when installed in a respective one of the internal chambers.

9. A multi-chamber internally damped tuned vibration absorber, comprising:

a mass having a first bore extending through the mass in a longitudinal direction, and a second bore extending through the mass in the longitudinal direction, the second bore being parallel with the first bore;

the first bore having a first opening and a second opening opposite the first opening, the first opening being narrower than the second opening;

the second bore having a third opening and a fourth opening opposite the third opening, the fourth opening being narrower than the third opening;

wherein the first opening and the third opening are on a first side of the mass, and the second opening and the fourth opening are on a second side of the mass, opposite the first side;

a first guide member extending through the first bore in the longitudinal direction, the first guide member having a narrow portion that protrudes through the first opening and a wide portion that protrudes through the second opening;

a second guide member extending through the second bore in the longitudinal direction, the second guide member having a narrow portion that protrudes through the fourth opening and a wide portion that protrudes through the third opening;

a first internal chamber formed in the first bore of the mass between the first opening and the wide portion of the first guide member;

a first damping member housed within the first internal chamber;

a second internal chamber formed in the second bore of the mass between the fourth opening and the wide portion of the second guide member;

a second damping member housed within the second internal chamber;

wherein the first damping member and the second damping member are configured to damp vibrational motion of the mass in the longitudinal direction; and an attachment member configured for mechanically coupling the first guide member and the second guide member to a structure for reducing a vibrational motion of the structure.

10. The tuned vibration absorber of claim 9, wherein the first damping member and the second damping member are compression springs.

11. The tuned vibration absorber of claim 9, the structure is one of a frame, a strut, a stringer, a skin portion, an engine beam mount, a rudder pedal, or a heads-up display assembly of an aircraft.

12. The tuned vibration absorber of claim 9, wherein the first bore and the second bore are sized to provide a predetermined amount of the mass for tuning the tuned vibration absorber to attenuate vibration at a desired frequency.

13. The tuned vibration absorber of claim 9, wherein a length the first internal chamber is configured to provide a predetermined preload of the first damping member.

14. The tuned vibration absorber of claim 9, further comprising:

a third bore extending through the mass in the longitudinal direction identical to the first bore;

a fourth bore extending through the mass in the longitudinal direction identical to the second bore;

a third guide member identical to the first guide member and extending through the third bore;

a fourth guide member identical to the second guide member and extending through the fourth bore;

a third internal chamber formed in the third bore identical to the first internal chamber;

a third damping member housed within the third internal chamber;

a fourth internal chamber formed in the fourth bore identical to the second internal chamber; and a fourth damping member housed within the fourth internal chamber, wherein the third damping member and the fourth damping member are configured to damp vibrational motion of the mass in the longitudinal direction.

15. The tuned vibration absorber of claim 9, comprising an elastomeric bumper adhered to an outside of the mass between the mass and the attachment member in the longitudinal direction, wherein the elastomeric bumper comprises a pair of ringed portions each having a circular hole configured to fit loosely around a guide member and a bridge portion connecting the pair of ringed portions.

16. A vibration-reduction apparatus, comprising:

a mass having a plurality of openings extending through the mass in a first direction;

a plurality of guide members each disposed within a respective one of the openings, wherein the guide members are configured to guide movement of the mass back and forth along the first direction;

a plurality of internal chambers each formed around a portion of a respective one of the guide members within a respective one of the openings;

a plurality of damping members each disposed in a respective one of the internal chambers, wherein the damping members are configured to dampen movement of the mass along the first direction;

an attachment member configured to mechanically couple the guide members to a structure for reducing a vibrational motion of the structure; and an elastomeric bumper adhered to an outside of the mass between the mass and the attachment member in the first direction, wherein the damping members provide a primary energy absorber and the elastomeric bumper provides a secondary energy absorber for high loading situations;

wherein the elastomeric bumper comprises:

a pair of ringed portions each comprising a circular hole, wherein the circular hole is configured to fit loosely around an end of one guide member; and a bridge portion coupling the pair of ringed portions.

* * * * *